3,784,708
DIRECTLY COMPRESSIBLE MONOCALCIUM PHOSPHATE
Joseph Anthony Ranucci, Bloomfield, N.J., and Prabhakar Ranchhordas Sheth, Nanuet, N.Y., assignors to Hoffmann-La Roche Inc., Nutley, N.J.
No Drawing. Filed Feb. 28, 1972, Ser. No. 230,068
Int. Cl. A61k 9/00
U.S. Cl. 424—357                    1 Claim

ABSTRACT OF THE DISCLOSURE

Directly compressible monocalcium phosphate (MCP) having a particle size distribution such that not less than 70% is below 74 microns, not less than about 98% is below 105 microns and not more than about 1% is larger than 150 microns as well as its use in directly compressible tablet formulations are disclosed.

BACKGROUND OF THE INVENTION

It has been long recognized in the pharmaceutical industry that many crystalline or powdered materials, due to their physical properties, cannot be compressed into tablets on automatic tabletting equipment. This statement is particularly true of substances having a very fine particle size.

The methods utilized in the prior art to form tablets from materials such as those described above include producing larger particles or conglomerates, e.g., by the conventional techniques of wet and dry granulation, containing these substances so that they can be readily tabletted. It is therefore considered unexpected that such substances could be directly compressed into tablets without prior granulation procedures by the addition of monocalcium phosphate, hereinafter MCP, having ultrafine particles size.

The use of MCP in tablet formulations has been long recognized in the tabletting art both as a filler and as a compression aid. The MCP so utilized, however, has been of a comparatively large particle size. For example, U.S. Pat. 3,134,719 teaches a process of preparing tablets utilizing mono-, di- or tribasic calcium phosphates having a particle size distribution such that at least 25% of the particles are greater than 125 microns. It has now been found that MCP having a particle size distribution such that 70% is below 74 microns, at least 98% is below 105 microns and not more than 1% is larger than 150 microns is suitable for rendering crystalline or powdered substances having poor tabletting properties directly compressible.

BRIEF SUMMARY OF THE INVENTION

The present invention is directed to a method of rendering crystalline or powdered substances heretofore not amenable to direct compression and having poor tabletting properties, generally, amenable to use in tablets made by direct compression processes. This is accomplished by combining such substances with MCP having an ultrafine particle size.

DETAILED DESCRIPTION OF THE INVENTION

The improvement of the tabletting properties of crystalline or powdered therapeutic substances having poor tabletting properties is accomplished according to this invention by combining such substances with at least 30% by weight and preferably from about 70% to about 90% by weight of MCP having ultrafine particle size.

Specifically, the MCP utilized in the practice of the invention has a particle size distribution of 70% smaller than 74 microns, 98% smaller than 105 microns, and not more than about 1% larger than 150 microns. MCP of such a fine particle size renders crystalline or powdered therapeutic substances having poor tabletting properties amenable to the formation of tablets on automatic equipment without prior granulation and additionally substantially increases the flow properties and handling of such substances. The increase in flow properties exhibited by the MCP of the present invention is considered quite unexpected as the flow properties of many pharmaceutical excipients commonly utilized in the compounding arts are materially reduced as particle size is reduced. The MCP of the present invention is also unexpectedly superior in flow properties in comparison to the coarser MCP particles utilized in the prior art. The superior flow properties of the MCP of the present invention are a distinct advantage as tablets can be produced therefrom on automatic tabletting eqiupment without expensive clogging of such equipment caused by agglomeration of the powders.

The superior flow properties of the fine particle MCP of the present invention is readily demonstrated by the following experiment. Precisely measured amounts of the powders to be tested are poured through a laboratory funnel held at a set distance from a smooth surface. The area of the conical pile of powder is then carefully measured and the angle of repose of the cone calculated therefrom. As a powder possessing good flow properties will form a flatter cone, smaller angles of repose are an indication of superior flow properties. It has been found that substances possessing an angle of repose greater than about 45° exhibit poor flow properties. Materials possessing such poor flow properties cannot be compressed into suitable pharmaceutical tablets by any conventional method known in the art. The poor flow properties of such substances prevents the passage of formulations containing them to the die cavities of automatic tabletting machines thereby clogging them with resulting unnecessary expenditures of time and money. Table I illustrates the angle of repose of the MCP of the present invention in comparison with MCP having a particle size distribution greater than that of the MCP of the invention. Table I also contains the angle of repose of other art recognized tablet excipients reduced to particle size comparable to the particle size of the MCP of the present invention.

TABLE I

| Substance | Size in microns | Angle of repose | Flow |
|---|---|---|---|
| MCP, anhydrous | 70% less than 74, 100% less than 125. | 33°43′ | Good. |
| MCP, monohydrate | 70% less than 74, 100% less than 125. | 29°44′ | Do. |
| MCP | 100% less than 354 | 51°47′ | Poor. |
| Dicalcium phosphate | 100% less than 88 | 51°16′ | Do. |
| Lactose—direct compression grade. | 100% less than 125 | 52°25′ | Do. |
| Mannitol | 100% less than 74 | 46°40′ | Do. |

The foregoing table clearly indicates that the fine particulate MCP of the present invention is clearly superior in flow properties to the coarser particulate MCP as well as other common tablet excipients, e.g., dicalcium phosphate and lactose prepared for direct compression formulations reduced to a comparatively fine particle size.

The fine particulate MCP of the present invention facilitates the production of tablets from crystalline or powdered therapeutic substances by direct compression on automatic tabletting equipment where such production was heretofore not possible. Therefore, the necessity of wet granulating or slugging such substances prior to tablet manufacture is completely eliminated thus realizing major economic advantages by the elimination of time-consuming labor, expensive equipment, production space and the like. The fact that the fine particulate MCP of the present invention flows freely and does not agglomerate during handling results in additional savings of a similar nature.

The MCP utilized in the practice of the instant invention can be either an anhydrous salt or a hydrate. The particle size distribution of this substance is as follows:

| | Percent |
|---|---|
| Above 150 microns | 0 to 1 |
| 105–150 microns | 0 to 2 |
| 75–105 microns | 1–30 |
| 5–74 microns | 70–100 |
| 5–50 microns | 50–75 |

It is considered unexpected that a MCP powder of such fine particle size not only flows easily and uniformly into the die cavities of automatic tabletting machines but compresses readily, without preliminary wet- or dry-granulation, into tablets which fully meet the accepted pharmaceutical standards of friability, hardness and the like.

The applicability of the fine particulate MCP to the formulation and production of tablets containing a crystalline therapeutic substance is governed primarily by the compatability of said therapeutic substance with the MCP and does not depend on the particle size of the substance. Such agents encompass the full range of substances known to be of therapeutic value subject, of course, to efficacy via oral administration. Such agents include, for example, the benzodiazepine psychotherapeutic agents such as, chlordiazepoxide, diazepam, oxazepam, fluorazepam and the like, analgesics such as, aspirin, certain vitamins such as pyridoxine, thiamine hydrochloride, vitamin $B_{12}$ and the like. The tablet formulation may be prepared simply by homogeneously blending the therapeutic substances to be tabletted with the MCP of the invention. Alternately, the therapeutic agents are dissolved in a suitable solvent and the resulting solution blended with the MCP after which the mixture is treated to remove the solvent.

The amount of the MCP incorporated into the tablet formulation according to this invention may vary over a considerable range depending on the physical characteristics and the therapeutic dosage of the active substance being utilized. Generally, MCP is utilized in a concentration of not less than 30% by weight based on the total weight of the finished tablet and may constitute up to about 99% by weight of said composition wherein the active agent utilized has an extremely small therapeutic dose, i.e., a fraction of a milligram. Generally, preferred tablet formulations in accordance with the present invention contain from about 70% to about 90% by weight MCP.

In accordance with the present invention, tablet formulations containing fine particulate MCP and therapeutically active substances may additionally contain small amounts of other conventional adjuvants recognized in the art of pharmaceutical compounding. Examples of such substances include lubricants such as, for example, magnesium stearate or calcium stearate, disintegrants such as, for example, starch or alginic acid and the like.

As mentioned previously, the MCP of the present invention may be utilized as a hydrate or in an anhydrous form. Obviously, the choice of which of these forms to use is governed by the sensitivity to water of the therapeutic agent being formulated. Where water sensitive substances are to be formulated, the anhydrous MCP is utilized so that small amounts of water which may be present during handling is taken up as bound water of hydration thus minimizing the possibility of degradation. Samples of these salts as utilized in the appended examples in accordance with the present invention have the following physical characteristics.

MCP monohydrate: bulk density of 61 pounds per cubic foot and particle size distribution in percent by weight follows:

| | Percent |
|---|---|
| Larger than 150 microns | 0.2 |
| 74–150 microns | 17.6 |
| 44–74 microns | 24.2 |
| Smaller than 44 microns | 58.0 |

MCP anhydrous: bulk density of 63 pounds per cubic foot and particle size distribution in percent by weight as follows:

| | Percent |
|---|---|
| 74–150 microns | 3.0 |
| 44–74 microns | 23.8 |
| Smaller than 44 microns | 73.2 |

The following examples further illustrate the invention. In the examples, the monocalcium phosphate monohydrate and monocalcium phosphate anhydrous utilized had the bulk density and particle size distribution given above.

Example 1

A total of 10.0 parts by weight of chlordiazepoxide free base was consecutively blended in a suitable mixer with 30.0 parts by weight of starch, 256.5 parts monocalcium phosphate, monohydrate and 3.5 parts by weight magnesium stearate. The resulting mixture was thoroughly blended and compressed into tablets using ⅜″ flat-faced beveled edge embossed punches. The tablets thus produced were of excellent quality and appearance. The tablets had hardness of 11–12 Strong Cobb Units and disintegration, friability, and weight variation were found to be acceptable. The tablets were formed on conventional equipment running the normal speed and no difficulties were encountered in the production.

Example 2

A total of 5.0 parts by weight diazepam, 25.2 parts by weight microcrystalline cellulose, 60.0 parts by weight starch, 207.5 parts by weight monocalcium phosphate (monohydrate) and 1.5 parts by weight magnesium stearate were thoroughly blended on a suitable mixer and compressed on an automatic tabletting machine equipped with ⅜″ flat-faced beveled edge embosed edges. The resulting tablets had a hardness of 15 Strong Cobb Units. The tablets were also found to be acceptable in terms of friability, disintegration and appearance.

Example 3

A total of 10.0 parts by weight chlordiazepoxide free base, 30.0 parts by weight microcrystalline cellulose, 15.0 parts by weight alginic acid, 243.0 parts by weight monocalcium phosphate and 2.0 parts by weight magnesium stearate were thoroughly blended in a suitable mixer and compressed in an automatic tabletting equipment utilizing ⅜″ flat-faced beveled edge embossed punches. The tablets thus produced had a hardness of 15 Strong Cobb Units. The tablets were also found to be acceptable in terms of friability, disintegration and appearance.

Example 4

A total of 200.0 parts by weight monocalcium phosphate, 10.0 parts by weight alginic acid, 20.0 parts by weight potato starch and 0.5 part by weight magnesium stearate were thoroughly blended in a suitable mixer and compressed on an automatic tabletting equipment equipped with flat-faced beveled each square punches. The tablets thus produced were acceptable in appearance, friability and disintegration. The tablets were formed by normal machine speeds and no difficulties were encountered in the production thereof.

Example 5

Tablets were formed in the manner of the preceding examples from the following formulations:

| Ingredient: | Parts by weight |
|---|---|
| Monocalcium phosphate | 125.0 |
| Potato starch | 70.0 |
| Stearic acid | 6.0 |
| Magnesium stearate | 0.5 |
| Clonazepam | 0.2 |

The tablets were acceptable in appearance, friability and disintegration. No problems were encountered in their production.

We claim:

1. In a method of avoiding clogging of the die cavities of automatic tabletting machinery during the compression of pharmaceutical tablets from a homogeneous mixture of a non-granulated therapeutically active material and a quantity of anhydrous monocalcium phosphate or a hydrated form thereof the improvement which comprises providing said monocalcium phosphate and said hydrated form thereof as finely divided particles having an angle of repose of about 33°43' and about 29°44', respectively, said particles being characterized in that not more than about 1% by weight are larger than 150 microns, not less than about 98% by weight are smaller than 105 microns and not less than about 70% by weight are smaller than 74 microns.

References Cited

UNITED STATES PATENTS 3,134,719   5/1964   Sheth et al. _____ 424—229

SHEP K. ROSE, Primary Examiner